United States Patent
Natarajan et al.

(10) Patent No.: US 12,017,679 B2
(45) Date of Patent: Jun. 25, 2024

(54) ADAPTIVE TRUST CALIBRATION

(71) Applicant: Honda Motor Co., Ltd., Tokyo (JP)

(72) Inventors: Manisha Natarajan, Atlanta, GA (US); Kumar Akash, Milpitas, CA (US); Teruhisa Misu, Mountain View, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 138 days.

(21) Appl. No.: 17/510,284

(22) Filed: Oct. 25, 2021

(65) Prior Publication Data

US 2023/0128456 A1 Apr. 27, 2023

(51) Int. Cl.
*B60W 60/00* (2020.01)
*B60W 40/04* (2006.01)
(Continued)

(52) U.S. Cl.
CPC .......... *B60W 60/001* (2020.02); *B60W 40/04* (2013.01); *B60W 40/09* (2013.01); *B60W 2050/0083* (2013.01); *B60W 2554/20* (2020.02); *B60W 2554/402* (2020.02); *B60W 2554/80* (2020.02)

(58) Field of Classification Search
CPC .... B60W 60/001; B60W 40/04; B60W 40/09; B60W 2554/20; B60W 2554/402; B60W 2554/80; B60W 2050/0083
See application file for complete search history.

(56) References Cited

U.S. PATENT DOCUMENTS 10,759,424 B2 * 9/2020 Misu ................... A61B 5/0077
11,430,231 B2 * 8/2022 Takamoto ............ G06V 20/597
(Continued)

OTHER PUBLICATIONS

Jarrod M Snider, "Automatic Steering Methods for Autonomous Automobile Path Tracking", Feb. 2009, Carnegie Mellon University (Year: 2009).*

(Continued)

*Primary Examiner* — Hussein Elchanti
*Assistant Examiner* — Kenneth M Dunne
(74) *Attorney, Agent, or Firm* — RANKIN, HILL & CLARK LLP

(57) ABSTRACT

An adaptive trust calibration based autonomous vehicle may include vehicle systems, a system behavior controller, and a driving automation controller. The system behavior controller may generate a driving automation signal indicative of a desired autonomous driving adaptation. The driving automation controller may control the vehicle systems based on parameters including a desired velocity, current velocity of the autonomous vehicle, desired minimum gap distance between the autonomous vehicle and a detected object, current gap distance gap between the autonomous vehicle and a detected object, relative velocity of the detected object with respect to the autonomous vehicle, desired time headway, desired maximum acceleration, desired braking deceleration, and an exponent. The driving automation controller may receive the driving automation signal and implement the desired autonomous driving adaptation via the vehicle systems by adjusting the parameters based on a type of object associated with the detected object.

17 Claims, 8 Drawing Sheets

| Parameter | Stop Sign | | Pedestrian | | Vehicular Traffic | |
|---|---|---|---|---|---|---|
| | Aggressive | Conservative | Aggressive | Conservative | Aggressive | Conservative |
| IDM Upper Limit | 15 m | 60 m | 15 m | 60 m | 15 m | 60 m |
| IDM Lower Limit | 6.5 m | 10 m | 8 m | 10 m | 8 m | 10 m |
| Minimum gap ($S_0$) | 1.0 m | 1.0 m | 1.0 m | 1.0 m | 5 m | 8 m |
| Stop Duration | 1.0 s | 3.0 s | 1.0 s | 1.5 s | 1.0 s | 1.5 s |
| Time Headway (T) | 0.25 s | 0.5 s | 0.25 s | 0.5 s | 0.8 s | 1.5 s |
| # Look ahead waypoints | 25 | 25 | 25 | 25 | 30 | 30 |
| # Predicted Poses (moving obstacles) | 5 | 5 | 5 | 5 | 5 | 5 |
| Max acc. (a) | 5.0 m/s$^2$ | 3.0 m/s$^2$ | 5.0 m/s$^2$ | 3.0 m/s$^2$ | 5.0 m/s$^2$ | 3.0 m/s$^2$ |
| Max dec. (b) | 4.5 m/s$^2$ | 1.5 m/s$^2$ | 4.5 m/s$^2$ | 1.5 m/s$^2$ | 4.5 m/s$^2$ | 1.5 m/s$^2$ |
| Desired speed ($V_0$) | 13.5 m/s | 12.0 m/s | 13.5 m/s | 12.0 m/s | 13.5 m/s | 12.0 m/s |
| $\delta$ | 4.0 | 4.0 | 4.0 | 4.0 | 4.0 | 4.0 |

(51) Int. Cl.
B60W 40/09 (2012.01)
B60W 50/00 (2006.01)

(56) References Cited

U.S. PATENT DOCUMENTS

| | | | | |
|---|---|---|---|---|
| 2015/0149017 | A1* | 5/2015 | Attard | B60W 30/18163 701/23 |
| 2015/0291146 | A1* | 10/2015 | Prakah-Asante | B60W 10/11 701/65 |
| 2017/0031364 | A1* | 2/2017 | Takahashi | G05D 1/0212 |
| 2017/0088143 | A1* | 3/2017 | Goldman-Shenhar | G05D 1/0088 |
| 2017/0136842 | A1* | 5/2017 | Anderson | B60G 17/016 |
| 2017/0267256 | A1* | 9/2017 | Minster | G01C 21/3461 |
| 2018/0361972 | A1* | 12/2018 | Zagorski | B60W 30/10 |
| 2019/0094865 | A1* | 3/2019 | Fletcher | G01C 21/26 |
| 2019/0213429 | A1* | 7/2019 | Sicconi | G06F 3/012 |
| 2019/0291728 | A1* | 9/2019 | Shalev-Shwartz | B60T 7/18 |

OTHER PUBLICATIONS

N. Adnan, S. Md Nordin, M. A. bin Bahruddin, and M. Ali, "How trust can drive forward the user acceptance to the technology? Invehicle technology for autonomous vehicle," Transportation Research Part A: Policy and Practice, vol. 118, pp. 819-836, 2018. [Online]. Available: https://www.sciencedirect.com/science/article/pii/S0965856418309030.

F. Chollet et al., "Keras," 2015. https://keras.io/.

A. Dettmann, F. Hartwich, P. Roßner, M. Beggiato, K. Felbel, J. Krems, and A. C. Bullinger, "Comfort or not? Automated driving style and user characteristics causing human discomfort in automated driving," International Journal of Human-Computer Interaction, vol. 37, No. 4, pp. 331-339, 2021. [Online]. Available: https://doi.org/10.1080/10447318.2020.1860518.

L. Kleisen, The relationship between thinking and driving styles and their contribution to young driver road safety. University of Canberra Bruce, Australia, 2011.

D. Vaughan, Sep. 2022. [Online]. Available: https://cran.r-project.org/web/packages/yardstick/vignettes/multiclass.html.

C. Basu, Q. Yang, D. Hungerman, M. Sinahal, and A. D. Dragan, "Do you want your autonomous car to drive like you?" in 2017 12th ACM/IEEE International Conference on Human-Robot Interaction (HRI. IEEE, 2017, pp. 417-425.

J. K. Choi and Y. G. Ji, "Investigating the importance of trust on adopting an autonomous vehicle," International Journal of Human-Computer Interaction, vol. 31, No. 10, pp. 692-702, 2015. [Online]. Available: https://doi.org/10.1080/10447318.2015.1070549.

N. Dillen, M. Ilievski, E. Law, L. E. Nacke, K. Czarnecki, and O. Schneider, "Keep calm and ride along: Passenger comfort and anxiety as physiological responses to autonomous driving styles," in Proceedings of the 2020 CHI conference on human factors in computing systems, 2020, pp. 1-13.

A. Eugensson, M. Brannstrom, D. Frasher, M. Rothoff, S. Solyom, and A. Robertsson, "Environmental, safety legal and societal implications of autonomous driving systems," in International Technical Conference on the Enhanced Safety of Vehicles (ESV). Seoul, South Korea, vol. 334, 2013.

C. Gold, M. Körber, C. Hohenberger, D. Lechner, and K. Bengler, "Trust in automation—before and after the experience of take-over scenarios in a highly automated vehicle," Procedia Manufacturing, vol. 3, pp. 3025-3032, 2015.

M. Hasenjäger and H. Wersing, "Personalization in advanced driver assistance systems and autonomous vehicles: A review," in 2017 IEEE 20th International Conference on Intelligent Transportation Systems (ITSC), 2017, pp. 1-7.

A. Kesting, M. Treiber, M. Schönhof, and D. Helbing, "Extending adaptive cruise control to adaptive driving strategies," Transportation Research Record, vol. 2000, No. 1, pp. 16-24, 2007. [Online]. Available: https://doi.org/10.3141/2000-03.

R. Krueger, T. H. Rashidi, and J. M. Rose, "Preferences for shared autonomous vehicles," Transportation Research Part C: Emerging Technologies, vol. 69, pp. 343-355, 2016.

Bellem, H., Thiel, B., Schrauf, M. and Krems, J.F., 2018. Comfort in automated driving: An analysis of preferences for different automated driving styles and their dependence on personality traits. Transportation research part F: traffic psychology and behaviour,55, pp. 90-100.

Ekman, F., Johansson, M., Bligård, L.O., Karlsson, M. and Strömberg, H., 2019. Exploring automated vehicle driving styles as a source of trust information. Transportation research part F: traffic psychology and behaviour, 65, pp. 268-279.

Ma, Z. and Zhang, Y., 2020, December. Investigating the Effects of Automated Driving Styles and Driver's Driving Styles on Driver Trust, Acceptance, and Take Over Behaviors. In Proceedings of the Human Factors and Ergonomics Society Annual Meeting (vol. 64, No. 1, pp. 2001-2005). Sage CA: Los Angeles, CA: Sage Publications.

Shubham Agrawal and Srinivas Peeta. 2021. Evaluating the impacts of driver's pre-warning cognitive state on takeover performance under conditional automation. Transportation Research Part F: Traffic Psychology and Behaviour 83 (Nov. 2021), 80-98. https://doi.org/10.1016/J.TRF.2021.10.004.

Kumar Akash, Wan-Lin Hu, Neera Jain, and Tahira Reid. 2018. A Classification Model for Sensing Human Trust in Machines Using EEG and GSR. ACM Trans. Interact. Intell. Syst. 8, 4, Article 8, 4 (2018), 1-20. https://doi.org/10.1145/3132743.

Kumar Akash, Neera Jain, and Teruhisa Misu. 2020. Toward Adaptive Trust Calibration for Level 2 Driving Automation. In ICMI 2020—Proceedings of the 2020 International Conference on Multimodal Interaction. Association for Computing Machinery, Inc, Utrecht, 538-547. https://doi.org/10.1145/3382507.3418885.

Bradley M. Appelhans and Linda J. Luecken. 2006. Heart Rate Variability as an Index of Regulated Emotional Responding:. https://doi.org/10.1037/1089-2680.10.3.229 10, 3 (Sep. 2006), 229-240. https://doi.org/10.1037/1089-2680.10.3.229.

Hanna Bellem, Thorben Schönenberg, Josef F. Krems, and Michael Schrauf. 2016. Objective metrics of comfort: Developing a driving style for highly automated vehicles. Transportation Research Part F: Traffic Psychology and Behaviour 41 (Aug. 2016), 45-54. https://doi.org/10.1016/J.TRF.2016.05.005.

Stephen M. Casner, Edwin L. Hutchins, and Don Norman. 2016. The challenges of partially automated driving. Commun. ACM 59, 5 (2016), 70-77. https://doi.org/10.1145/2830565.

Liang-Chieh Chen, Yukun Zhu, George Papandreou, Florian Schroff, and Hartwig Adam. 2018. Encoder-Decoder with Atrous Separable Convolution for Semantic Image Segmentation. In In Proceedings of the Eujropean conference on computer vision (ECCV). Springer Science & Business Media, Munich, 81-818. https://github.com/tensorflow/models/tree/master/.

Yannick Forster, Johannes Kraus, Sophie Feinauer, and Martin Baumann. 2018. Calibration of trust expectancies in conditionally automated driving by brand, reliability information and introductionary videos: An online study. In Proceedings—10th International ACM Conference on Automotive User Interfaces and Interactive Vehicular Applications, AutomotiveUI 2018. Association for Computing Machinery, Inc, Pittsburgh, 118-128. https://doi.org/10.1145/3239060.3239070.

Sabu George, Manohara Pai, Radhika M Pai, and Samir Kumar Praharaj. 2017. Eye blink count and eye blink duration analysis for deception detection; Eye blink count and eye blink duration analysis for deception detection. IEEE, Udupi, 23-229. https://doi.org/10.1109/ICACCI.2017.8125844.

Brano Glumac and François Des Rosiers. 2020. Practice briefing-Automated valuation models (AVMs): their role, their advantages and their limitations. Journal of Property Investment&Finance 39, 5 (2020), 481-491. https://doi.org/10.1108/JPIF-07-2020-0086.

Stefan Griesche Bosch, Mandy Dotzauer, Stefan Griesche, Eric Nicolay, Dirk Assmann, and David Käthner. 2016. Should my car drive as I do? What kind of driving style do drivers prefer for the design of automated driving functions? Should my car drive as I do? What kind of driving style do drivers prefer for the design of

(56) References Cited

OTHER PUBLICATIONS automated driving functions? Soll mein Aut. raunschweiger Symposium 10, 11 (2016), 185-204. https://www.researchgate.net/publication/294087276.

Franziska Hartwich, Matthias Beggiato, and Josef F Krems. 2018. Driving Comfort, Enjoyment, and Acceptance of Automated Driving—Effects of Drivers' Age and Driving Style Familiarity. Ergonomics 0139 (2018), 0-1. https://doi.org/10.1080/00140139.2018.1441448.

Jesper F. Hopstaken, Dimitri van der Linden, Arnold B. Bakker, and Michiel A.J. Kompier. 2015. The window of my eyes: Task disengagement and mental fatigue covary with pupil dynamics. Biological Psychology 110 (Sep. 2015), 100-106. https://doi.org/10.1016/J.BIOPSYCHO.2015.06.013.

Zhongxu Hu, Chen Lv, Peng Hang, Chao Huang, and Yang Xing. 2021. Data-driven Estimation of Driver Attention using Calibration-free Eye Gaze and Scene Features. IEEE Transactions on Industrial Electronics 69, 2 (2021), 1800-1808. https://doi.org/10.1109/TIE.2021.3057033.

Keunwoo Kim, Minjung Park, and Youn Kyung Lim. 2021. Guiding Preferred Driving Style Using Voice in Autonomous Vehicles: An On-Road Wizard-of-Oz Study. In Designing Interactive Systems Conference 2021. Association for Computing Machinery, Inc, Virtual, 352-364. https://doi.org/10.1145/3461778.3462056.

Victor L. Knoop, Meng Wang, Isabel Wilmink, D. Marika Hoedemaeker, Mark Maaskant, and Evert Jeen Van der Meer. 2019. Platoon of SAE Level-2 Automated Vehicles on Public Roads: Setup, Traffic Interactions, and Stability. Transportation Research Record 9 (2019), 311-322. https://doi.org/10.1177/0361198119845885.

John D. Lee and Katrina A. See. 2004. Trust in Automation: Designing for Appropriate Reliance. Human Factors and Ergonomics Society 46, 1 (2004), 50-80.

David G. Lowe. 2004. Distinctive Image Features from Scale-Invariant Keypoints. International Journal of Computer Vision 2004 60:2 60, 2 (Nov. 2004), 91-110. https://doi.org/10.1023/B:VISI.0000029664.99615.94.

Zheng Ma and Yiqi Zhang. 2021. Drivers trust, acceptance, and takeover behaviors in fully automated vehicles: Effects of automated driving styles and driver's driving styles. Accident Analysis & Prevention 159 (Sep. 2021), 106238. https://doi.org/10.1016/J.AAP.2021.106238.

Marius Muja and David G Lowe. 2009. Fast Approximate Nearest Neighbors With Automatic Algorithm Configuration. VISAPP 1, 2 (2009), 331-340.

Manisha Natarajan, Kumar Akash, and Teruhisa Misu. 2022. Toward Adaptive Driving Styles for Automated Driving with Users' Trust and Preferences. In In Proceedings of the 2022 ACM/IEEE International Conference on Human-Robot Interaction. IEEE, Hokkaido, 940-944.

Fabian Pedregosa, Gael Varoquaux, Alexandre Gramfort, Vincent Michel, Bertrand Thirion, Olivier Grisel, Mathieu Blondel, Peter Prettenhofer, Ron Weiss, Vincent Dubourg, Jake Vanderplas, Alexandre Passos, David Cournapeau, Matthieu Brucher, Matthieu Perrot, and Édouard Duchesnay. 2011. Scikit-learn: Machine learning in Python. Journal of Machine Learning Research 12 (2011), 2825-2830.

Rachel Phinnemore, Gabriele Cimolino, Pritam Sarkar, Ali Etemad, and T. C.Nicholas Graham. 2021. Happy Driver: Investigating the Effect of Mood on Preferred Style of Driving in Self-Driving Cars. In In Proceedings of the 9th International Conference on Human-Agent Interaction. ACM, Virtual, 139-147. https://doi.org/10.1145/3472307.3484169.

PPS. 2022. TactileGlove. https://pressureprofile.com/body-pressure-mapping/tactile-glove.

Christina M. Rudin-Brown and Heather A. Parker. 2004. Behavioural adaptation to adaptive cruise control (ACC): Implications for preventive strategies. Transportation Research Part F: Traffic Psychology and Behaviour 7, 2 (Mar. 2004), 59-76. https://doi.org/10.1016/J.TRF.2004.02.001.

SAE. 2018. Taxonomy and Definitions for Terms Related to Driving Automation Systems for On-Road Motor Vehicles—SAE International. https://www.sae.org/standards/content/j3016_201806/.

Shimmer. 2022. Shimmer3 GSR+ Unit. https://shimmersensing.com/product/shimmer3-gsr-unit/.

Sónia Soares, António Lobo, Sara Ferreira, Liliana Cunha, and António Couto. 2021. Takeover performance evaluation using driving simulation: a systematic review and meta-analysis. European Transport Research Review 13 (2021), 1-18. https://doi.org/10.1186/s12544-021-00505-2.

Tobii. 2022. Tobii Pro Glasses 3. https://www.tobiipro.com/product-listing/tobii-pro-glasses-3/.

Julia Trabulsi, Kian Norouzi, Seidi Suurmets, Mike Storm, and Thomas Zoëga Ramsøy. 2021. Optimizing Fixation Filters for Eye-Tracking on Small Screens. Frontiers in Neuroscience 15 (Nov. 2021), 1257. https://doi.org/10.3389/FNINS.2021.578439/BIBTEX.

Epic Games. 2022. Unreal Engine. https://www.unrealengine.com/en-US/.

"Intelligent driver model." Wikipedia, Wikimedia Foundation, Published date Oct. 25, 2021 https://en.wikipedia.org/wiki/Intelligent_driver_model. Accessed date Oct. 25, 2021.

Ekman, F., Johansson, M., Karlsson, M., Strömberg, H. and Bligård, L.O., 2021. Trust in what? Exploring the interdependency between an automated vehicle's driving style and traffic situations. Transportation research part F: traffic psychology and behaviour, 76, pp. 59-71.

Hoffmann, Gabriel M., Claire J. Tomlin, Michael Montemerlo, and Sebastian Thrun. "Autonomous Automobile Trajectory Tracking for Off-Road Driving: Controller Design, Experimental Validation and Racing." American Control Conference. 2007, pp. 2296-2301. doi:10.1109/ACC.2007.4282788 http://ai.stanford.edu/~gabeh/papers/hoffmann_stanley_control07.pdf.

Körber, M., Baseler, E. and Bengler, K., 2018. Introduction matters: Manipulating trust in automation and reliance in automated driving. Applied ergonomics, 66, pp. 18-31.

Lee, J.D., Liu, S.Y., Domeyer, J. and DinparastDjadid, A., 2019. Assessing drivers' trust of automated vehicle driving styles with a two-part mixed model of intervention tendency and magnitude. Human factors, p. 0018720819880363.

Treiber, Martin; Hennecke, Ansgar; Helbing, Dirk (2000), "Congested traffic states in empirical observations and microscopic simulations", Physical Review E,62(2): 1805-1824. (https://en.wikipedia.org/wiki/Intelligent_driver_model).

Treiber, M. and Kesting, A., 2013. Traffic flow dynamics. Traffic Flow Dynamics: Data, Models and Simulation, Springer-Verlag Berlin Heidelberg.

Walker, F., Verwey, W. and Martens, M., 2018, June. Gaze behaviour as a measure of trust in automated vehicles. In Proceedings of the 6th Humanist Conference (Jun. 2018).

J. L. Andreassi, Psychophysiology: Human behavior and physiological response. Psychology Press, 2010.

S. E. Baek, H. S. Kim, and M. Han, "Personalized speed planning algorithm using a statistical driver model in car-following situations," International Journal of Automotive Technology, vol. 23, No. 3, pp. 829-840, 2022.

T. Chen, S. Kornblith, M. Norouzi, and G. Hinton, "A simple framework for contrastive learning of visual representations," in International conference on machine learning. PMLR, 2020, pp. 1597-1607.

D. Chicco, "Siamese neural networks: An overview," Artificial Neural Networks, pp. 73-94, 2021.

D. Chung, K. Tahboub, and E. J. Delp, "A two stream siamese convolutional neural network for person re-identification," in Proceedings of the IEEE international conference on computer vision, 2017, pp. 1983-1991.

E. de Gelder, I. Cara, J. Uittenbogaard, L. Kroon, S. van Iersel, and J. Hogema, "Towards personalised automated driving: Prediction of preferred acc behaviour based on manual driving," in 2016 IEEE Intelligent Vehicles Symposium (IV). IEEE, 2016, pp. 1211-1216.

N. Du, F. Zhou, E. M. Pulver, D. M. Tilbury, L. P. Robert, A. K. Pradhan, and X. J. Yang, "Examining the effects of emotional valence and arousal on takeover performance in conditionally

(56) References Cited

OTHER PUBLICATIONS automated driving," Transportation research part C: emerging technologies, vol. 112, pp. 78-87, 2020.

J. B. Greenblatt and S. Shaheen, "Automated vehicles, on-demand mobility, and environmental impacts," Current sustainable/renewable energy reports, vol. 2, No. 3, pp. 74-81, 2015.

W. Hayale, P. Negi, and M. Mahoor, "Facial expression recognition using deep siamese neural networks with a supervised loss function," in 2019 14th IEEE International Conference on Automatic Face & Gesture Recognition (FG 2019). IEEE, 2019, pp. 1-7.

S.-C. Hsiao, D.-Y. Kao, Z.-Y. Liu, and R. Tso, "Malware image classification using one-shot learning with siamese networks," Procedia Computer Science, vol. 159, pp. 1863-1871, 2019.

S.-A. Kaye, S. Nandavar, S. Yasmin, I. Lewis, and O. Oviedo-Trespalacios, "Consumer knowledge and acceptance of advanced driver assistance systems," Transportation Research Part F: Traffic Psychology and Behaviour, vol. 90, pp. 300-311, 2022.

D. P. Kingma and J. Ba, "Adam: A method for stochastic optimization," arXiv preprint arXiv:1412.6980, 2014.

V. K. Kukkala, J. Tunnell, S. Pasricha, and T. Bradley, "Advanced driver-assistance systems: A path toward autonomous vehicles," IEEE Consumer Electronics Magazine, vol. 7, No. 5, pp. 18-25, 2018.

C. Lee, B. Seppelt, B. Reimer, B. Mehler, and J. F. Coughlin, "Acceptance of vehicle automation: Effects of demographic traits, technology experience and media exposure," in Proceedings of the Human Factors and Ergonomics Society Annual Meeting, vol. 63. Sage Publications Sage CA: Los Angeles, CA, 2019, pp. 2066-2070.

Y. Y. Lee, M. Dong, V. Krishnamoorthy, K. Akash, Z. Zheng, T. Misu, and G. Huang, "The impacts of adaptive driving styles on trust in level 2 automated vehicles," in Proceedings of the Human Factors and Ergonomic Society annual meeting, vol. 66, No. 1. SAGE Publishing, 2022, pp. 345-345.

B. C. Lee and V. G. Duffy, "The effects of task interruption on human performance: A study of the systematic classification of human behavior and interruption frequency," Human Factors and Ergonomics in Manufacturing & Service Industries, vol. 25, No. 2, pp. 137-152, 2015.

S. Mai, H. Hu, and S. Xing, "Divide, conquer and combine: Hierarchical feature fusion network with local and global perspectives for multimodal affective computing," in Proceedings of the 57th annual meeting of the association for computational linguistics, 2019, pp. 481-492.

B. Moradi, "The new optimization algorithm for the vehicle routing problem with time windows using multi-objective discrete learnable evolution model," Soft Computing, vol. 24, No. 9, pp. 6741-6769, 2020.

I. Nastjuk, B. Herrenkind, M. Marrone, A. B. Brendel, and L. M. Kolbe, "What drives the acceptance of autonomous driving? an investigation of acceptance factors from an end-user's perspective," Technological Forecasting and Social Change, vol. 161, p. 120319, 2020.

Y. Niu, D. Kong, R. Wen, Z. Cao, and J. Xiao, "An improved learnable evolution model for solving multi-objective vehicle routing problem with stochastic demand," Knowledge-Based Systems, vol. 230, p. 107378, 2021.

Z. Sajedinia, K. Akash, Z. Zheng, T. Misu, M. Dong, V. Krishnamoorthy, K. Martinez, K. Sureshbabu, and G. Huang, "Investigating users' preferences in adaptive driving styles for level 2 driving automation," in 14th International Conference on Automotive User Interfaces and Interactive Vehicular Applications, 2022, pp. 162-170.

M. Teste, A. Broutin, M. Marty, M. C. Valéra, F. Soares Cunha, and E. Noirrit-Esclassan. 2021. Toothbrushing in children with autism spectrum disorders: qualitative analysis of parental difficulties and solutions in France. European Archives of Paediatric Dentistry 22, 6 (2021), 1049-1056. https://doi.org/10.1007/s40368-021-00640-3.

A. Ullah, K. Muhammad, K. Haydarov, I. U. Haq, M. Lee, and S. W. Baik, "One-shot learning for surveillance anomaly recognition using siamese 3d cnn," in 2020 International Joint Conference on Neural Networks (IJCNN). IEEE, 2020, pp. 1-8.

F. Wang and H. Liu, "Understanding the behaviour of contrastive loss," in Proceedings of the IEEE/CVF conference on computer vision and pattern recognition, 2021, pp. 2495-2504.

L. Yue, M. Abdel-Aty, Y. Wu, and L. Wang, "Assessment of the safety benefits of vehicles' advanced driver assistance, connectivity and low level automation systems," Accident Analysis & Prevention, vol. 117, pp. 55-64, 2018.

N. Zeghidour, G. Synnaeve, N. Usunier, and E. Dupoux, "Joint learning of speaker and phonetic similarities with siamese networks." in Interspeech, 2016, pp. 1295-1299.

C. Zhang, W. Liu, H. Ma, and H. Fu, "Siamese neural network based gait recognition for human identification," in 2016 ieee international conference on acoustics, speech and signal processing (ICASSP). IEEE, 2016, pp. 2832-2836.

Z. Zheng, K. Akash, T. Misu, V. Krishnamoorthy, M. Dong, Y. Lee, and G. Huang, "Identification of adaptive driving style preference through implicit inputs in sae l2 vehicles," in Proceedings of the 2022 International Conference on Multimodal Interaction, 2022, pp. 468-475.

Z. K. Zheng, J. E. Staubitz, A. S. Weitlauf, J. Staubitz, M. Pollack, L. Shibley, M. Hopton, W. Martin, A. Swanson, P. Juarez, et al., "A predictive multimodal framework to alert caregivers of problem behaviors for children with asd (premac)," Sensors, vol. 21, No. 2, p. 370, 2021.

Z. K. Zheng, K. Akash, and T. Misu, "Detection of perceived discomfort in sae l2 automated vehicles through driver takeovers and physiological spikes," in 2022 IEEE 25th International Conference on Intelligent Transportation Systems (ITSC). IEEE, 2022, pp. 1717-1722.

K. H. Zou, J. R. Fielding, S. G. Silverman, and C. M. Tempany, "Hypothesis testing i: proportions," Radiology, vol. 226, No. 3, pp. 609-613, 2003.

* cited by examiner

| Parameter | Stop Sign | | Pedestrian | | Vehicular Traffic | |
|---|---|---|---|---|---|---|
| | Aggressive | Conservative | Aggressive | Conservative | Aggressive | Conservative |
| IDM Upper Limit | 15 m | 60 m | 15 m | 60 m | 15 m | 60 m |
| IDM Lower Limit | 6.5 m | 10 m | 8 m | 10 m | 8 m | 10 m |
| Minimum gap ($S_0$) | 1.0 m | 1.0 m | 1.0 m | 1.0 m | 5 m | 8 m |
| Stop Duration | 1.0 s | 3.0 s | 1.0 s | 1.5 s | 1.0 s | 1.5 s |
| Time Headway (T) | 0.25 s | 0.5 s | 0.25 s | 0.5 s | 0.8 s | 1.5 s |
| # Look ahead waypoints | 25 | 25 | 25 | 25 | 30 | 30 |
| # Predicted Poses (moving obstacles) | 5 | 5 | 5 | 5 | 5 | 5 |
| Max acc. (a) | 5.0 m/s$^2$ | 3.0 m/s$^2$ | 5.0 m/s$^2$ | 3.0 m/s$^2$ | 5.0 m/s$^2$ | 3.0 m/s$^2$ |
| Max dec. (b) | 4.5 m/s$^2$ | 1.5 m/s$^2$ | 4.5 m/s$^2$ | 1.5 m/s$^2$ | 4.5 m/s$^2$ | 1.5 m/s$^2$ |
| Desired speed ($V_0$) | 13.5 m/s | 12.0 m/s | 13.5 m/s | 12.0 m/s | 13.5 m/s | 12.0 m/s |
| $\delta$ | 4.0 | 4.0 | 4.0 | 4.0 | 4.0 | 4.0 |

FIG. 4

| Parameter | Stop Sign | | | | Pedestrian | | | | Vehicular Traffic | | | |
|---|---|---|---|---|---|---|---|---|---|---|---|---|
| | HA | LA | LC | HC | HA | LA | LC | HC | HA | LA | LC | HC |
| IDM Upper Limit | 15 m | 15 m | 60 m | 75 m | 15 m | 15 m | 60 m | 75 m | 15 m | 18 m | 60 m | 50 m |
| IDM Lower Limit | 12.5 m | 10 m | 5 m | 6.5 m | 10 m | 9 m | 10 m | 12.5 m | 5 m | 6.5 m | 10 m | 12.0 m |
| Minimum gap ($S_0$) | 1.0 m | 1.0 m | 1.25 m | 1.5 m | 1.0 m | 1.0 m | 1.25 m | 1.5 m | 4 m | 5 m | 6.5 m | 8 m |
| Stop Duration | 1.0 s | 1.0 s | 2.0 s | 3.0 s | 0.5 s | 0.5 s | 1.0 s | 1.0 s | 0.5 s | 0.5 s | 1.0 s | 1.0 s |
| Time Headway (T) | 0.1 s | 0.1 s | 0.25 s | 0.25 s | 0.1 s | 0.1 s | 0.25 s | 0.25 s | 0.8 s | 0.9 s | 1.5 s | 2 s |
| # Look ahead waypoints | | | | | 30 | 30 | 30 | 30 | 30 | 30 | 30 | 30 |
| # Predicted Poses (moving obstacles) | | | | | 5 | 5 | 5 | 5 | 5 | 5 | 5 | 5 |
| Max. acc. (a) | 5.0 m/s² | 4.5 m/s² | 3.0 m/s² | 1.0 m/s² | 5.0 m/s² | 4.5 m/s² | 3.0 m/s² | 1.0 m/s² | 5.0 m/s² | 4.5 m/s² | 3.0 m/s² | 1.0 m/s² |
| Max. dec. (b) | 5.0 m/s² | 3.0 m/s² | 2.0 m/s² | 1.5 m/s² | 5.0 m/s² | 3.0 m/s² | 2.0 m/s² | 1.5 m/s² | 5.0 m/s² | 3.0 m/s² | 2.0 m/s² | 1.5 m/s² |
| Desired speed ($V_d$) | 14.5 m/s | 13.5 m/s | 12.0 m/s | 11.0 m/s | 14.5 m/s | 13.5 m/s | 12.0 m/s | 11.0 m/s | 14.5 m/s | 13.5 m/s | 12.0 m/s | 11.0 m/s |
| δ | 4.0 | 4.0 | 4.0 | 4.0 | 4.0 | 4.0 | 4.0 | 4.0 | 4.0 | 4.0 | 4.0 | 4.0 |

500

Highly Aggressive (HA), Less Aggressive (LA), Less Conservative (LC), Highly Conservative (HC)

FIG. 5

ADAPTIVE TRUST CALIBRATION

BACKGROUND

Individuals are increasingly becoming dependent on automated systems in vehicles ranging from advanced driver-assistance systems (ADAS) like adaptive cruise control and collision avoidance to self-driving automation. Even with significant growth in technological capabilities, human supervision and intervention are still required. Researchers have shown that human trust plays a critical role in these interactions between human and automated systems. On one hand, low levels of trust may lead to disuse of automation and therefore losing the benefits of the automation. On the other hand, over-trust may lead to a human disengaging fully from the driving process.

Trust calibration is necessary for successful interaction between humans and automation. Human trust plays a fundamental role in their interactions with automated systems. However, human trust is an abstract, multidisciplinary concept, with individual disciplines characterizing a different relationship as "trust". To avoid trust miscalibration (i.e., over trust or under trust), there is a need to design human-aware systems that may predict human trust and adapt its behavior accordingly.

For example, during an interaction between a human and a driving automation system, the human expects and trusts the automated system to drive in an uncertain and risky environment. Quantifying and predicting trust is a challenging task given that its meaning changes across contexts as well as between different humans. In particular, trust miscalibration, caused by under trust or over trust, leads to disuse of automation. Therefore, the present challenge is to design human-aware automation that may adapt its behavior to avoid trust miscalibration.

BRIEF DESCRIPTION

According to one aspect, an adaptive trust calibration based autonomous vehicle may include one or more vehicle systems, a system behavior controller, and a driving automation controller. The system behavior controller may generate a driving automation signal indicative of a desired autonomous driving adaptation. The driving automation controller may control one or more of the vehicle systems based on one or more parameters including a desired velocity, a current velocity of the autonomous vehicle, a desired minimum gap distance between the autonomous vehicle and a detected object, a current gap distance gap between the autonomous vehicle and a detected object, a relative velocity of the detected object with respect to the autonomous vehicle, a desired time headway, a desired maximum acceleration, a desired braking deceleration, and an exponent. The driving automation controller may receive the driving automation signal. The driving automation controller may implement the desired autonomous driving adaptation via one or more of the vehicle systems by adjusting one or more of the parameters based on a type of object associated with the detected object.

The type of object may include a road sign, a pedestrian, or another vehicle. The driving automation controller may include a high-level controller and a low-level controller. The high-level controller may implement the desired autonomous driving adaptation via one or more of the vehicle systems by adjusting one or more of the parameters based on a type of object associated with the detected object. The low-level controller may control one or more of the vehicle systems based on one or more of the adjusted parameters. The low-level controller may include a Stanley controller.

The desired autonomous driving adaptation may be a more aggressive autonomous driving adaptation or a more conservative autonomous driving adaptation. The driving automation signal may be indicative of an over trust scenario or an under trust scenario. One or more of the vehicle systems may include a controller area network (CAN) bus providing the current velocity of the autonomous vehicle. One or more of the vehicle systems may include a sensor detecting the detected object.

According to one aspect, a system for adaptive trust calibration may include an autonomous vehicle including one or more vehicle systems, a system behavior controller, and a driving automation controller. The system behavior controller may generate a driving automation signal indicative of a desired autonomous driving adaptation. The driving automation controller may control one or more of the vehicle systems based on one or more parameters including a desired velocity, a current velocity of the autonomous vehicle, a desired minimum gap distance between the autonomous vehicle and a detected object, a current gap distance gap between the autonomous vehicle and a detected object, a relative velocity of the detected object with respect to the autonomous vehicle, a desired time headway, a desired maximum acceleration, a desired braking deceleration, and an exponent. The driving automation controller may receive the driving automation signal. The driving automation controller may implement the desired autonomous driving adaptation via one or more of the vehicle systems by adjusting one or more of the parameters based on a type of object associated with the detected object.

The type of object may include a road sign, a pedestrian, or another vehicle. The driving automation controller may include a high-level controller and a low-level controller. The high-level controller may implement the desired autonomous driving adaptation via one or more of the vehicle systems by adjusting one or more of the parameters based on a type of object associated with the detected object. The low-level controller may control one or more of the vehicle systems based on one or more of the adjusted parameters. The low-level controller may include a Stanley controller.

According to one aspect, a computer-implemented method for adaptive trust calibration may include receiving a driving automation signal indicative of a desired autonomous driving adaptation, controlling one or more of the vehicle systems based on one or more parameters including a desired velocity, a current velocity of an autonomous vehicle, a desired minimum gap distance between the autonomous vehicle and a detected object, a current gap distance gap between the autonomous vehicle and a detected object, a relative velocity of the detected object with respect to the autonomous vehicle, a desired time headway, a desired maximum acceleration, a desired braking deceleration, and an exponent, and adjusting control of one or more of the vehicle systems by adjusting one or more of the parameters based on a type of object associated with the detected object.

The type of object may include a road sign, a pedestrian, or another vehicle. The desired autonomous driving adaptation may be a more aggressive autonomous driving adaptation or a more conservative autonomous driving adaptation. The driving automation signal may be indicative of an over trust scenario or an under trust scenario.

BRIEF DESCRIPTION OF THE DRAWINGS

FIG. 4 is an exemplary set of parameters in association with the system for adaptive trust calibration of FIGS. 1-2, according to one aspect.

FIG. 5 is an exemplary set of parameters in association with the system for adaptive trust calibration of FIGS. 1-2, according to one aspect.

DETAILED DESCRIPTION

Figure 1:
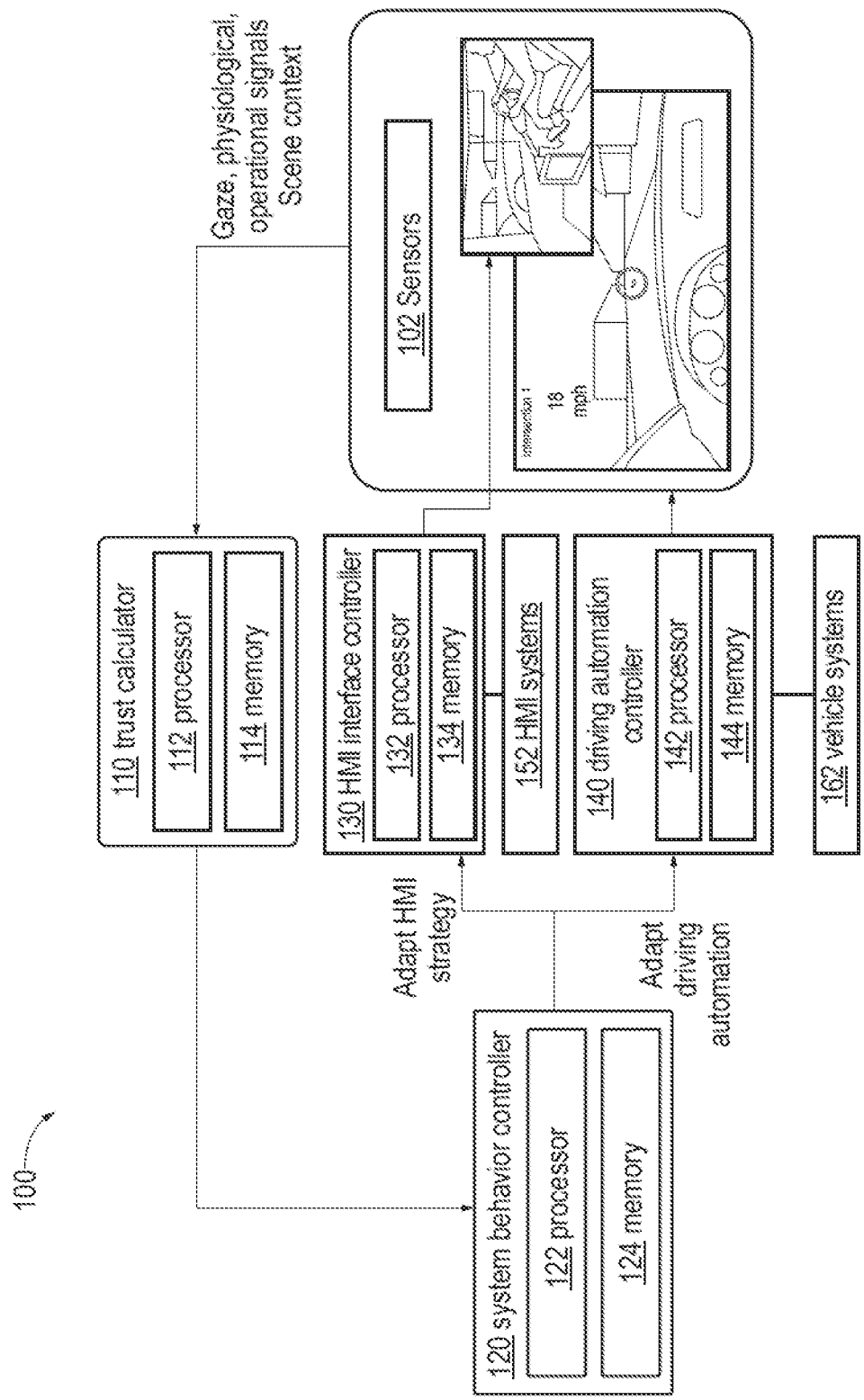
FIG. 1 is an exemplary component diagram of a system for adaptive trust calibration, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, and/or driving. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pre-tensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is an exemplary component diagram of a system 100 for adaptive trust calibration or an adaptive trust calibration based autonomous vehicle, according to one aspect. The system 100 for adaptive trust calibration may include one or more sensors 102, a trust model calculator 110, a behavior controller 120 or system behavior controller, an HMI interface controller 130, a driving automation controller 140, an HMI system 152, and one or more vehicle systems 162.

The trust model calculator 110 may include and/or be implemented via a processor 112 and a memory 114. The behavior controller 120 may include and/or be implemented via a processor 122 and a memory 124. The HMI interface controller 130 may include and/or be implemented via a processor 132 and a memory 134. The driving automation controller 140 may include and/or be implemented via a processor 142 and a memory 144. One or more of the processors 112, 122, 132, 142 and memories 114, 124, 134, 144 of the respective trust model calculator 110, the behavior controller 120, the HMI interface controller 130, the driving automation controller 140, or the HMI interface may be implemented as the same (i.e., a single) processor and memory, according to one aspect. According to another aspect, the processors 112, 122, 132, 142 and memories 114, 124, 134, 144 may be implemented separately and the trust model calculator 110, the behavior controller 120, the HMI interface controller 130, the driving automation controller 140 may be implemented as separate components.

One or more of the trust model calculator 110, the behavior controller 120, the HMI interface controller 130, the driving automation controller 140, or the HMI interface may be implemented with a disk drive or a storage drive and/or be connected via a bus such that respective components are operably connected and be capable of computer communication.

The trust model calculator 110 may include a trust model database utilized for calculating trust scores. The trust model calculator 110 may be modeled based on a deep neural network, a convolutional neural network (CNN), or a recurrent neural network (RNN). The system considers that human trust dynamics have two time scales: a fast varying short-term trust that captures the effect of instantaneous situation (similar to situational trust) and a relatively slow varying long-term trust that captures the effect of a human's experience during an interaction (similar to learned trust).

The trust model calculator 110 may receive occupant sensor data associated with an occupant of an autonomous vehicle, receive a first scene context sensor data associated with an environment of the autonomous vehicle at a first time, a second scene context sensor data associated with the environment of the autonomous vehicle at a second time, and generate a trust model for the occupant based on the occupant sensor data and the scene context sensor data.

The autonomous vehicle may autonomously operate or drive through the environment. Within a semi-autonomous operating mode for the vehicle, steering, acceleration, and braking may be autonomously controlled by the driving automation controller 140 of the autonomous vehicle (herein 'vehicle'). However, the driver may still be responsible to manually drive the vehicle such that the driver may have to supervise and takeover control of the steering, acceleration, and/or braking of the vehicle in one or more circumstances as deemed by the driver. Accordingly, the semi-autonomous operating mode may reduce the driver's workload. An adaptive trust application executed by the behavior controller 120 may utilize computer-executed processes to thereby ensure that benefits of such operation of the vehicle are enhanced by maximizing the driver's trust in the semi-autonomous control of the vehicle.

The occupant sensor data may include one or more of occupant gaze data or occupant physiological data received from the sensors 102. The scene context sensor data may include one or more operational signals (e.g., signals which may be received from sensors 102 of the vehicle, or received from the vehicle CAN, such as velocity, acceleration, steering angle, etc.) for the autonomous vehicle. In any event, the occupant sensor data and the scene context sensor data may be received from sensors 102 on the autonomous vehicle. Examples of sensors 102 include an eye gaze sensor, LiDAR sensors, radar sensors, image capture sensors, a camera system including cameras, a global positioning system (GPS), a laser projection system, etc.

According to one aspect, the laser projection system may include one or more LiDAR transceivers. The one or more LiDAR transceivers of the laser projection system may be disposed at respective external front, rear, and/or side portions of the vehicle including but not limited to different portions of bumpers, body panels, fenders, lighting units, windows, or the windshield. The one or more respective LiDAR transceivers may include one or more planar sweep lasers that may be configured to oscillate and emit one or more laser beams of ultraviolet, visible, or near infrared light toward the surrounding environment of the vehicle. The laser projection system may be configured to receive one or more reflected laser waves based on one or more laser beams emitted by the LiDAR transceivers. The one or more reflected laser waves may be reflected off of one or more objects (e.g., static and/or dynamic objects) that may be located within the surrounding environment of the vehicle.

In one configuration, the laser projection system may be configured to output LiDAR data associated to one or more reflected laser waves to the adaptive trust application executed by the behavior controller 120. The adaptive trust application may be configured to analyze the LiDAR data that pertains to the surrounding environment of the vehicle to determine the scene of the surrounding environment of the vehicle based on the location of one or more dynamic objects that may be located within the surrounding environment of the vehicle, one or more static objects that may be located within the surrounding environment of the vehicle, one or more roads/pathways (e.g., guardrails, curbs, barrier, etc.) that are located within the surrounding environment of the vehicle, one or more lanes that may be located upon one or more roads/pathways that are located within the surrounding environment of the vehicle, and the like. The adaptive trust application may determine a scene complexity (e.g., value, designation) that may be associated with the scene of the vehicle as determined based on LiDAR data provided by the laser projection system and/or the image data provided by the camera system.

The sensors 102 may include a camera system of the vehicle which may feed sensor data to the trust model calculator 110. The camera system may include one or more cameras positioned at one or more internal portions of an interior cabin of the vehicle to capture images of the driver (e.g., operator or occupant) of the vehicle. The camera system may also include one or more cameras that are positioned at one or more external portions of the vehicle to capture images of the surrounding environment of the vehicle (e.g., a predetermined area located around (e.g., front, rear, side) the vehicle).

In any event, the sensors 102 may detect objects exterior to the vehicle and thereafter, the system behavior controller 120 or the driving automation controller 140 may classify the detected object according to an object type. For example, a detected object may be classified as one of a road sign, a pedestrian, a stationary object, or another vehicle (e.g., vehicular traffic).

Cameras that are positioned at one or more internal portions of an interior cabin of the vehicle may be configured to capture images of the driver's eyes to be analyzed, including the driver's eye movements within the vehicle. According to one aspect, the one or more cameras may be configured to capture images of the driver's eyes and send respective image data to the adaptive trust application executed on the behavior controller 120 and to the trust model calculator 110. The adaptive trust application may be configured to analyze the image data associated with one or more images captured for a predetermined period of time to analyze one or more gaze cues to recognize the driver's eye gaze cues over a predetermined period of time.

According to one aspect, the adaptive trust application may continuously analyze the gaze cues to recognize the driver's eye gaze directions. Specifically, the adaptive trust application may detect the location of the driver's eyes from the image(s) sent by the camera system and may specifically evaluate specific areas of the eyes (e.g., iris, pupil, corners of the eye, etc.). The adaptive trust application may utilize virtually any method to perform gaze detection and translate the gaze cues to determine the driver's eye gaze directions. According to one aspect, the adaptive trust application may analyze the eye gaze directions of the driver based off of a linear model that may consider the evaluation of the specific areas of the eyes of the driver of the vehicle.

The trust model calculator 110 may determine an over trust or under trust scenario based on the information from the detected location of the driver's eyes from the image(s) sent by the camera system. For example, if a driver looks away from the roadway or environment for greater than a threshold amount of time, the trust model calculator 110 may determine the over trust scenario. As another example, if the driver looks away from the roadway or environment for greater than a threshold amount of time and the vehicle is driving in an environment which is not merely a straight roadway (e.g., not a highway scenario), the trust model calculator 110 may determine the over trust scenario. Conversely, if the driver is continuously looking at an upcoming obstacle within the roadway or environment for greater than a threshold amount of time, the trust model calculator 110 may determine the under trust scenario.

With respect to the one or more cameras of the camera system that are positioned at the external surrounding environment of the vehicle, the one or more cameras may be disposed at one or more external front portions of the vehicle, similarly to the LiDAR sensors. The one or more cameras of the camera system may be disposed at external front portions of the vehicle, including, but not limited to different portions of the vehicle dashboard, vehicle bumper, vehicle front lighting units, vehicle fenders, and the windshield. According to one aspect, the one or more cameras may be configured as RGB cameras which capture RGB bands that are configured to capture rich information about object appearance, as well as relationships and interactions between the vehicle and objects within the surrounding environment of the vehicle.

According to another aspect, the one or more cameras may be stereoscopic cameras that are configured to capture environmental information in the form three-dimensional images. In one or more configurations, the one or more cameras may be configured to capture one or more first person viewpoint RGB images/videos of the surrounding environment of the vehicle. The camera system may be configured to convert one or more RGB images/videos (e.g., sequences of images) into image data that is communicated to the adaptive trust application to be analyzed.

According to one aspect, the adaptive trust application may be configured to analyze the image data that pertains to the surrounding environment of the vehicle and determine a scene of the surrounding environment of the vehicle. The scene of the surrounding environment may include one or more dynamic objects or obstacles (e.g., other vehicles, pedestrians) that may be located within the surrounding environment of the vehicle, one or more static objects or features of the environment (e.g., street signs, trees, buildings) that may be located within the surrounding environment of the vehicle, one or more roads/pathways that may be located within the surrounding environment of the vehicle (e.g., streets, intersections), one or more lanes that may be located upon one or more roads/pathways that may be located within the surrounding environment of the vehicle, and the like. As discussed below, the adaptive trust application may determine a scene complexity (e.g., value, designation) that may be associated with the scene of the vehicle as determined based on image data provided by the camera system and/or data provided by a laser projection system of the vehicle.

Trust dynamics or the trust model may be determined based on the driver's reliance on the semi-autonomous or autonomous operation of the vehicle, as calculated by the trust model calculator 110 based on data received from the sensors 102. Additionally, a real-time automation transparency may be provided to the driver, occupant, or operator of the vehicle in the form of augmented reality cues which may be analyzed with respect to determining trust dynamics. In addition, automation reliability that is associated with the semi-autonomous or autonomous operation of the vehicle and a scene complexity determined with respect to a scene of the surrounding environment of the vehicle may be analyzed with respect to determining trust dynamics or the trust model.

Additionally, workload dynamics for the trust model may be determined based on the eye gaze directions of the driver over a predetermined period of time. Automation transparency, automation reliability, and scene complexity may also be utilized to determine workload dynamics for the trust model. Accordingly, the adaptive trust application may capture a dynamic interaction between trust and workload behavior as it evolves over time (e.g., in real-time and as a predicted future point in time) and may be configured to process and implement an optimal control policy to appropriately vary automation transparency. According to one aspect, in addition to varying automation transparency, the adaptive trust application may be configured to alter the semi-autonomous or autonomous operation of one or more driving functions to achieve trust calibration.

The behavior controller 120 may receive the trust model for the occupant of the autonomous vehicle. The behavior controller 120 may determine an over trust scenario or an under trust scenario based on the trust model and a trust model threshold. When the under trust scenario is determined, the HMI controller may execute the adaptive trust calibration application to adjust, by increasing, a level of automation transparency for the user or occupant, thereby calibrating the human trust to be increased by offering additional clarity as to what the autonomous vehicle is 'thinking' and sharing the decision making process with the user. The behavior controller 120 may determine the over trust scenario or the under trust scenario based on the second scene context sensor data. In this way, the behavior controller 120 may utilize past over trust or past under trust scenarios to adapt or enhance trust calibration for future scenarios.

The behavior controller 120 may select a combination or merely one of a driving automation action or an HMI action based on the trust model and the scene context. According to one aspect, the behavior controller 120 may implement both the driving automation action and the HMI action when the trust score is lower than a scenario where the trust score is higher. In the higher trust score scenario, the behavior controller 120 may implement merely the HMI action via the HMI interface controller 130. According to another aspect, if the trust score is greater or even higher, the behavior controller 120 may implement merely the driving automation action via the driving automation controller 140. According to another aspect, the behavior controller 120 may implement additional driving automation actions or additional HMI actions if under trust scenarios repeatedly occur for a similar scene context. The behavior controller 120 may phase out additional driving automation actions or additional HMI actions for under trust scenarios to gradually acclimate a user or a driver to autonomous driving within different scene contexts.

The system behavior controller 120 may generate a driving automation signal indicative of a desired autonomous driving adaptation. For example, the desired autonomous driving adaptation may be a more aggressive autonomous driving adaptation or a more conservative autonomous driving adaptation. The driving automation signal may be indicative of an over trust scenario or an under trust scenario. Thus, the system behavior controller 120 may optimize driving behavior to calibrate trust (e.g., mitigate overtrust to avoid misuse and prevent under-trust to avoid dis-use) and/or reduce workload.

According to one aspect, the over trust scenario may be associated with the desired more aggressive autonomous driving adaptation. According another aspect, the over trust scenario may be associated with the desired more conservative autonomous driving adaptation.

According to one aspect, the under trust scenario may be associated with the desired more aggressive autonomous driving adaptation. According another aspect, the under trust scenario may be associated with the desired more conservative autonomous driving adaptation.

The HMI interface controller 130 may execute one or more applications, operating systems, vehicle system and subsystem user interfaces, among others. The HMI interface controller 130 may execute an adaptive trust calibration application that adjusts a level of automation transparency that is provided in the form of one or more augmented reality cues provided to an individual or occupant of the vehicle during semi-autonomous or autonomous operation of the vehicle. The adaptive trust application may vary automation transparency and functionality with respect to one or more driving functions of the vehicle that may be based on human trust and workload estimates, and may utilize CNNs, RNNs, Markov models, etc.

The HMI interface controller 130 may generate and implement an HMI action via one or more of the HMI systems 152 based on the determination of the over trust scenario or the determination of the under trust scenario. HMI systems 152 may include a speaker, an audio device, a display, a head up display (HUD), a meter display, a dashboard display, an instrument cluster display, etc. The HMI interface controller 130 may generate and implement the HMI action based on the second scene context sensor data. The HMI action may include one or more of displaying a display cue, a display alert, providing an audio cue or audio alert, or providing a haptic cue associated with a road element within the environment. Additionally, the HMI action may include one or more of an action to enable, disable, or adjust one or more of the vehicle systems 162. The vehicle systems 162 may include one or more of an air conditioning (A/C) system, a fan system, a seat system, a controller area network (CAN) bus, or an augmented reality system. The CAN bus may be utilized to provide vehicular state data, such as a current velocity of the autonomous vehicle, to the driving automation controller 140 (e.g., and further to the high-level controller or low-level controller thereof).

Examples of under trust may include taking over driving or autonomous operation when an object or obstacle is detected, even when the autonomous vehicle has already detected the object or obstacle and has planned on executing a corresponding driving automation action in response to the detected object or obstacle. Examples of physiological data received associated with under trust may include increased human workload (e.g., providing more driving inputs or additional eye gaze activity compared to a baseline), increased stress (e.g., increased heartbeat, elevated body temperature, etc.) during autonomous operation of the vehicle. Other examples of under trust may include failing to activate or utilize automated driving (AD) or advanced driver-assistance systems (ADAS) features in situations or scenarios which are within an AD/ADAS design domain (e.g., when the autonomous vehicle is travelling along a straight roadway with no traffic within a radius, etc.).

Examples of over trust may include disregarding the environment around the vehicle for greater than a threshold amount of time, such as when the user or occupant begins to read a book, interact with a mobile device, tend to work, or ignore warnings provided by the autonomous vehicle, for example. Other examples of over trust may include activating or utilizing the AD/ADAS features in situations or scenarios which are outside the AD/ADAS design domain (e.g., instruction manual of autonomous vehicle states it may not be desirable to activate AD/ADAS in an exemplary scenario, but the operator or driver engages the AD/ADAS features contrary to the warning). Similarly, another example of over trust may include failing to take manual control or a late take over during potential unreliable operation of the autonomous vehicle (e.g., after a takeover request or warning has been issued by the vehicle via the HMI system 152).

The driving automation action may include one or more of adjusting acceleration or deceleration, minimum distance boundary to a road element, or a stopping distance from a point or line in the environment. In this regard, the driving automation controller 140 may execute autonomous driving commands to operate the vehicle to autonomously control one or more driving functions of the vehicle. Additional examples of driving automation action may include, but may not be limited to steering, braking, accelerating, merging, turning, coasting, etc.

According to one aspect, the adaptive trust application may utilize data included within the trust database of the trust model calculator 110 to communicate with the driving automation controller 140 to control the level of automation transparency and/or an autonomous operation of one or more driving functions of the vehicle. In some scenarios, the adaptive trust application may be configured to communicate with the driving automation controller 140 to provide autonomous operation of one or more driving functions of the vehicle to account for one or more external factors that may include, but are not limited to, road/pathway conditions of a road/pathway on which the vehicle is traveling, a lane in which the vehicle is traveling, status of traffic signals, traffic patterns, traffic regulations, etc.

According to one aspect, the environment may be a simulated environment and the autonomous vehicle may be simulated within the simulated environment.

According to one aspect, the vehicle may additionally include a communication device (i.e., of vehicle system 162) that may be operably controlled by the system behavior controller 120. The communication device may include one or more transceivers of the vehicle. The communication device may be configured to communicate through the internet through one or more wireless communication signals that may include, but may not be limited to Bluetooth® signals, Wi-Fi signals, ZigBee signals, Wi-Max signals, and the like. The communication device may be configured to communicate through the internet to send and receive communication signals to and from an externally hosted server infrastructure or an external server. According to one aspect, the trust model calculator 110 may be hosted on the external server and may execute the adaptive trust application and/or the trust model calculator 110 to utilize processing power to determine an effect on human trust and workload with respect to automated driving of the vehicle to thereby process the control policy used to control autonomous transparency associated with the semi-autonomous or autonomous operation of at least one driving function of the vehicle.

Neural network may be utilized to model the effects of human trust and workload on observable variables using a Markov decision process model to thereby enable the application to analyze the human trust model and workload dynamics based on the effects modeled using the Markov decision process model. According to one aspect, the components of the external server including the neural network may be operably controlled by a processor. The processor may be configured to operably control the neural network to utilize machine learning/deep learning to provide artificial intelligence capabilities that may be utilized to build a machine learning dataset.

With continued reference to the aspect where the trust model calculator 110 is hosted on the external server, the processor may be operably connected to the memory. The memory may store one or more operating systems, applications, associated operating system data, application data, executable data, and the like. According to this aspect, the machine learning dataset may be configured as a dataset that includes one or more fields associated with data that may pertain to one or more determined levels of human trust and workload with respect to the automated driving of the vehicle that is based on one or more of the scene complexity, the automation reliability, and the automation transparency. In particular, the one or more fields may include a real-time determination of driver reliance, automation reliability, scene complexity, and automation transparency levels provided to the driver of the vehicle. Additionally, the one or more fields may include a prediction of driver reliance and driver workload that may be based on the real-time determination of driver reliance and driver workload.

According to one aspect, the processor of the external server may additionally be configured to communicate with a communication device. The communication device may be configured to communicate through the internet through one or more wireless communication signals that may include, but may not be limited to Bluetooth® signals, Wi-Fi signals, ZigBee signals, Wi-Max signals, and the like. According to one aspect, the communication device may be configured to connect to the internet to send and receive communication signals to and from the vehicle. In this way, the system 100 for adaptive trust calibration may calibrate human trust accordingly based on multiple aspects.

Figure 2:
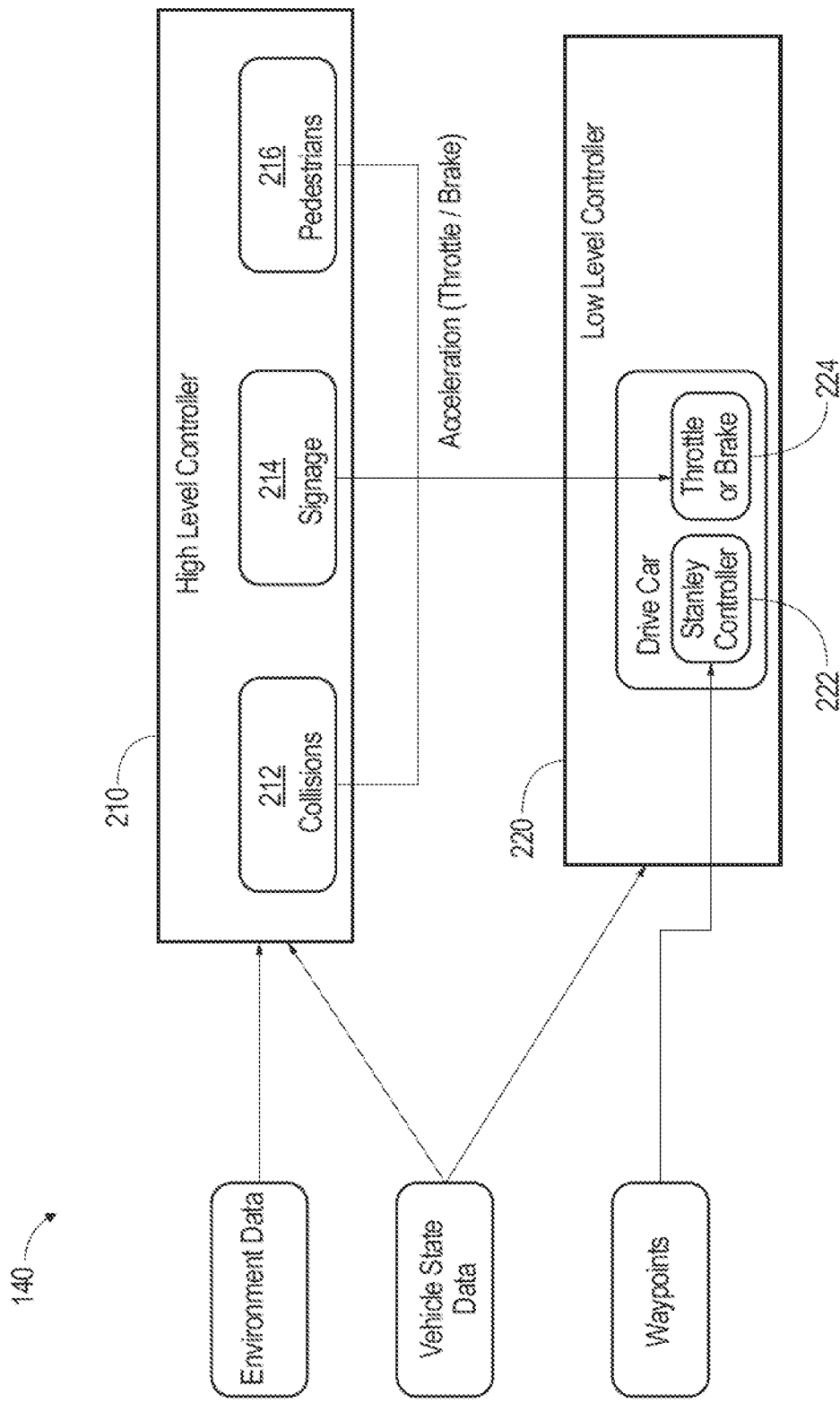
FIG. 2 is an exemplary component diagram of a system for adaptive trust calibration, according to one aspect.

FIG. 2 is an exemplary component diagram of a driving automation controller 140 for an adaptive trust calibration based autonomous vehicle or a system for adaptive trust calibration, according to one aspect. As seen in FIG. 2, the driving automation controller 140 may include a high-level controller 210 and a low-level controller 220. The driving automation controller 140 may receive environment data from the sensors 102, vehicle state data from one or more of the vehicle systems 162 (e.g., CAN bus), and waypoint or navigation data from one or more of the vehicle systems 162 (e.g., navigation system).

The driving automation controller 140 may control one or more of the vehicle systems 162 based on one or more parameters including a desired velocity (e.g., one of the desired autonomous driving adaptations), a current velocity of the autonomous vehicle (e.g., provided by the CAN bus), a desired minimum gap distance between the autonomous vehicle and a detected object (e.g., one of the desired autonomous driving adaptations), a current gap distance gap between the autonomous vehicle and a detected object (e.g., provided by one of the sensors 102), a relative velocity of the detected object with respect to the autonomous vehicle (e.g., provided by one of the sensors 102), a desired time headway (e.g., one of the desired autonomous driving adaptations), a desired maximum acceleration (e.g., one of the desired autonomous driving adaptations), a desired braking deceleration (e.g., one of the desired autonomous driving adaptations), and an exponent (e.g., one of the desired autonomous driving adaptations). In this way, the driving automation controller 140 may implement an intelligent driver model (IDM). Examples of parameters that may be changed, to change the driving aggressiveness or conservativeness may include maximum, minimum isolation, maximum acceleration, the desired speed of the vehicle, the desired minimum gap, the exponent, and time headway.

Further, the driving automation controller 140 may receive the driving automation signal and the high-level controller 210 may adjust one or more of the parameters based on a detected object and a type of object associated with the detected object. For example, the detected object may be another vehicle 212, a road sign 214, or a pedestrian 216. Examples of road signs may include stop signs, red lights, yellow lights, etc.

Explained yet another way, the high-level controller 210 of the driving automation controller 140 may implement the desired autonomous driving adaptation via one or more of the vehicle systems 162 by calculating or adjusting one or more of the parameters based on the type of object associated with the detected object or the type of object detected for each detected object. In this way, the high-level controller 210 may implement the desired autonomous driving adaptation via one or more of the vehicle systems 162 by adjusting one or more of the parameters based on the type of object associated with the detected object. Stated another way, the high-level controller 210 may decide the acceleration and deceleration, given the environment information (e.g., from the sensors 102) and the vehicle state (e.g., from the CAN bus).

Thus, the driving automation controller 140 may adapt aggressiveness or conservativeness of the driving automation process by changing maximum acceleration or deceleration, minimum distance boundary to maintain from road elements or road objects, stopping distance from stop lines, etc. In this way, the driving automation controller 140 may adjust the intelligent driver model (IDM) on the fly or in real-time to account for a variety of scenarios, such as stop signs, pedestrians, red lights, etc.

According to one aspect, the high-level controller 210 of the driving automation controller 140 may set actual gaps to be a large value when there are no leading vehicles. In this scenario where there are no leading vehicles, the high-level controller 210 may output an acceleration for maintaining the speed limit.

According to one aspect, the high-level controller 210 of the driving automation controller 140 may set negligible values for time headway and minimum gap to stop at the stop line if the detected object is a stop sign or a red light and assume that there may be a stopped vehicle positioned at the stop line.

According to one aspect, the high-level controller 210 of the driving automation controller 140 may set a higher minimum distance and slow down when other vehicles or vehicular traffic approaches the ego-vehicle or autonomous vehicle at turns or intersections.

The high-level controller 210 of the driving automation controller 140 may facilitate a gradual, controlled stop for the autonomous vehicle when an obstacle is detected. To enable different driving behaviors, the high-level controller 210 may set different upper and lower distance thresholds to control the autonomous vehicle. For example, if the distance between the autonomous vehicle and obstacle is greater than an upper threshold, the high-level controller 210 may set a desired velocity to a current speed limit. Alternatively, if the distance between the autonomous vehicle and obstacle is less than a lower threshold, the high-level controller 210 may set a desired velocity to stop the autonomous vehicle.

Each node in the high-level controller 210 (e.g., pedestrian, vehicle, stop sign, red light, etc.) may have its own IDM to calculate a desired throttle, which may be communicated to the low-level controller 220.

The low-level controller 220 may include a Stanley controller 222 and a throttle or brake controller 224. The low-level controller 220 may control one or more of the vehicle systems 162 based on one or more of the adjusted parameters or parameters adjusted by the high-level controller 220. The throttle or brake controller 224 may select the most conservative of the communicated desired throttles to be implemented if all detected object types are present. Stated another way, if all of detected object types exist at a given point or simultaneously or concurrently, the low-level controller 220 may select one of the adjusted parameters associated the minimum throttle or the maximum brake and implement that parameter.

According to one aspect, the high-level controller 210 of the driving automation controller 140 may implement a modified IDM based on:

$$\frac{dv}{dt} = a\left(1 - \left(\frac{v}{v_0}\right)^\delta - \left(\frac{s^*(v, \Delta v)}{s}\right)^2\right);$$

$$1 - \left(\frac{v}{v_0}\right)^\delta$$

may be representative of a tendency to accelerate;

$$\left(\frac{s^*(v, \Delta v)}{s}\right)^2$$

may be representative of a tendency to decelerate;

$$s^*(v, \Delta v) = s_0 + \max\left[0, \left(vT + \frac{v\Delta v}{2\sqrt{ab}}\right)\right]$$

may be representative of desired dynamic gap;
a may be representative of maximum desired acceleration;
b may be representative of maximum desired deceleration;
v may be representative of a current velocity of the vehicle or autonomous vehicle;
$v_0$ may be representative of a desired velocity of the vehicle or autonomous vehicle;
$s_0$ may be representative of a desired minimum gap distance between the vehicle or autonomous vehicle and a detected object;
s may be representative of an actual gap distance between the vehicle or autonomous vehicle and the detected object;
δ may be representative of an exponent;
T may be representative of time headway;
Δv may be representative of a relative velocity of the detected object with respect to the autonomous vehicle;

According to one aspect, a more aggressive desired autonomous driving adaptation may be associated with a lower time headway T, a lower desired minimum gap distance $s_0$, a higher desired velocity $v_0$, a higher maximum desired acceleration α, and a higher maximum desired deceleration b compared to a less aggressive desired autonomous driving adaptation associated with a higher time headway T, a higher desired minimum gap distance $s_0$, a lower desired velocity $v_0$, a lower maximum desired acceleration α, and a lower maximum desired deceleration b.

Figure 3:
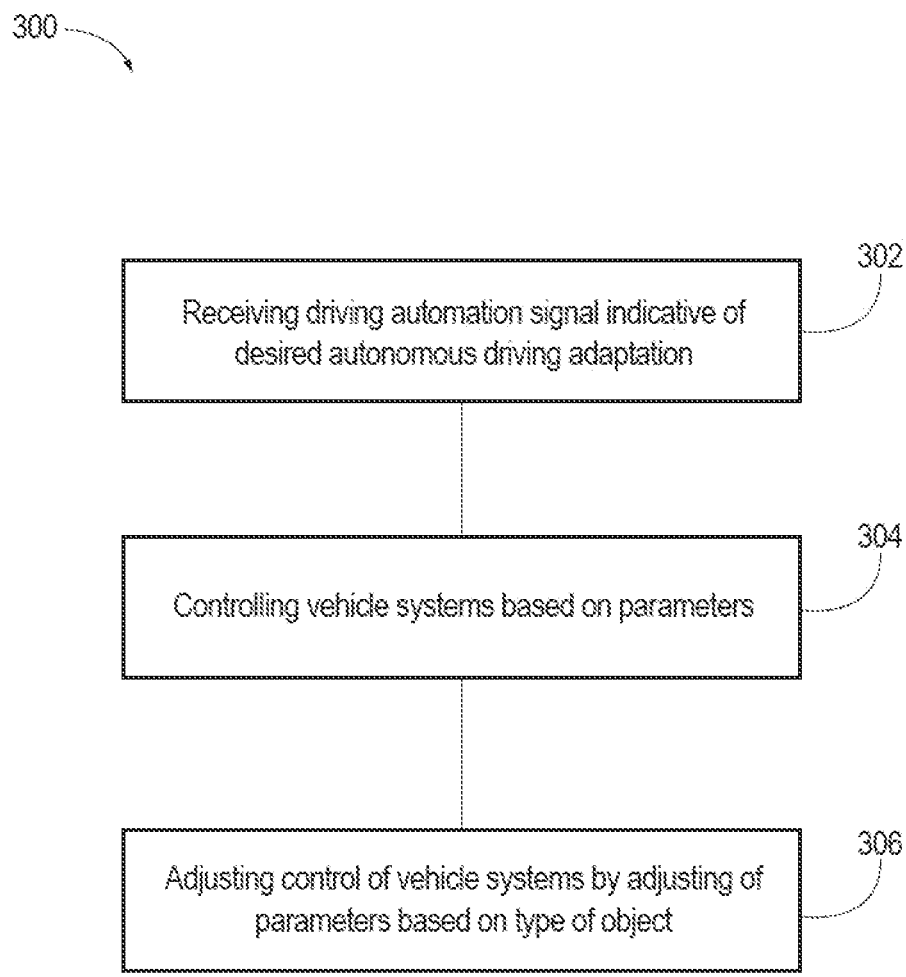
FIG. 3 is an exemplary flow diagram of a method for adaptive trust calibration, according to one aspect.

FIG. 3 is an exemplary flow diagram of a method for adaptive trust calibration, according to one aspect. According to one aspect, a computer-implemented method 300 for adaptive trust calibration may include receiving 302 a driving automation signal indicative of a desired autonomous driving adaptation, controlling 304 one or more of the vehicle systems based on one or more parameters including a desired velocity, a current velocity of an autonomous vehicle, a desired minimum gap distance between the autonomous vehicle and a detected object, a current gap distance gap between the autonomous vehicle and a detected object, a relative velocity of the detected object with respect to the autonomous vehicle, a desired time headway, a desired maximum acceleration, a desired braking deceleration, and an exponent, and adjusting 306 control of one or more of the vehicle systems by adjusting one or more of the parameters based on a type of object associated with the detected object.

FIG. 4 is an exemplary set of parameters in association with the system for adaptive trust calibration of FIGS. 1-2, according to one aspect.

FIG. 5 is an exemplary set of parameters in association with the system for adaptive trust calibration of FIGS. 1-2, according to one aspect.

Based on FIGS. 4-5, the parameters, when implemented by the driving automation controller 140, may cause the autonomous vehicle to drive in a more aggressive or more conservative manner.

Examples of more aggressive driving may include slowing down closer to an intersection or crosswalk, not waiting for other vehicles, incoming traffic, or pedestrians, a smaller stop duration, maintaining a smaller distance with a lead vehicle, driving with a jerkier trajectory, overtaking stopped vehicles quicker.

Examples of more conservative driving may include slowing down farther from an intersection or crosswalk, waiting for other vehicles, incoming traffic, or pedestrians, a larger stop duration, maintaining a larger distance with a lead vehicle, driving with a smoother trajectory, waiting longer prior to overtaking stopped vehicles.

Figure 6:
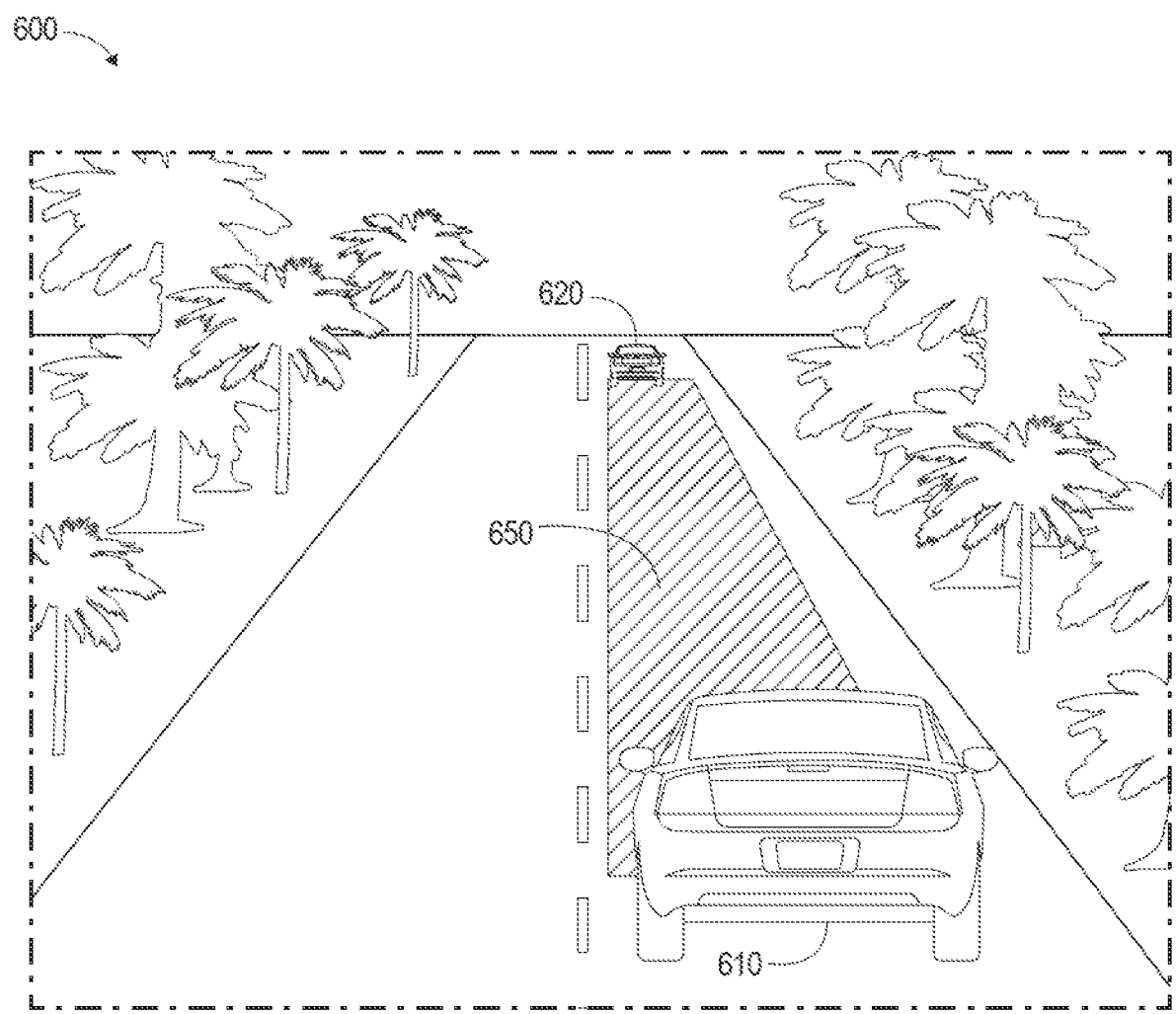
FIG. 6 is an exemplary scenario where the system for adaptive trust calibration of FIGS. 1-2 may be implemented, according to one aspect.

FIG. 6 is an exemplary scenario where the system for adaptive trust calibration of FIGS. 1-2 may be implemented, according to one aspect. As seen in FIG. 6, the autonomous vehicle 610 may have an increased following distance 650 from the other vehicle 620 when the desired automation driving adaption is less aggressive or more conservative.

Figure 7:
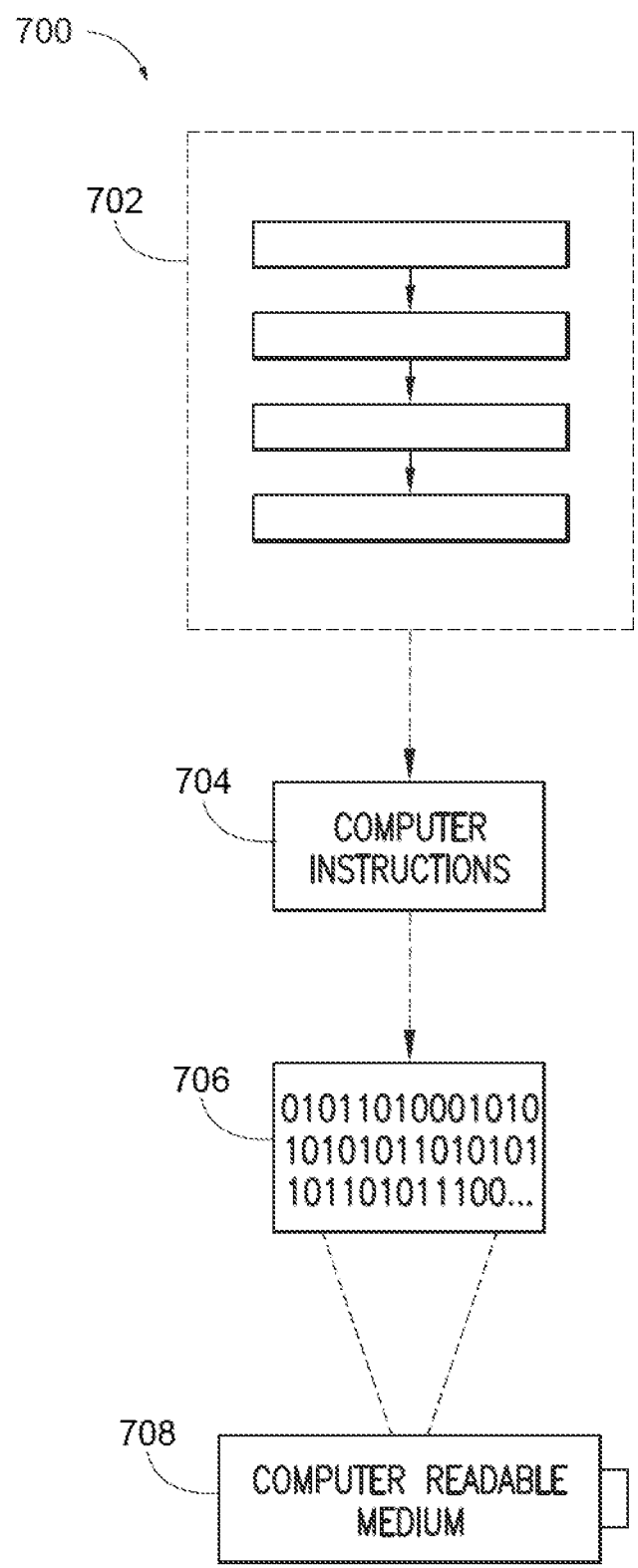
FIG. 7 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This encoded computer-readable data 706, such as binary data including a plurality of zero's and one's as shown in 706, in turn includes a set of processor-executable computer instructions 704 configured to operate according to one or more of the principles set forth herein. In this implementation 700, the processor-executable computer instructions 704 may be configured to perform a method 702, such as the method 300 of FIG. 3. In another aspect, the processor-executable computer instructions 704 may be configured to implement a system, such as the system 100 of FIG. 1 or the system 140 of FIG. 2. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
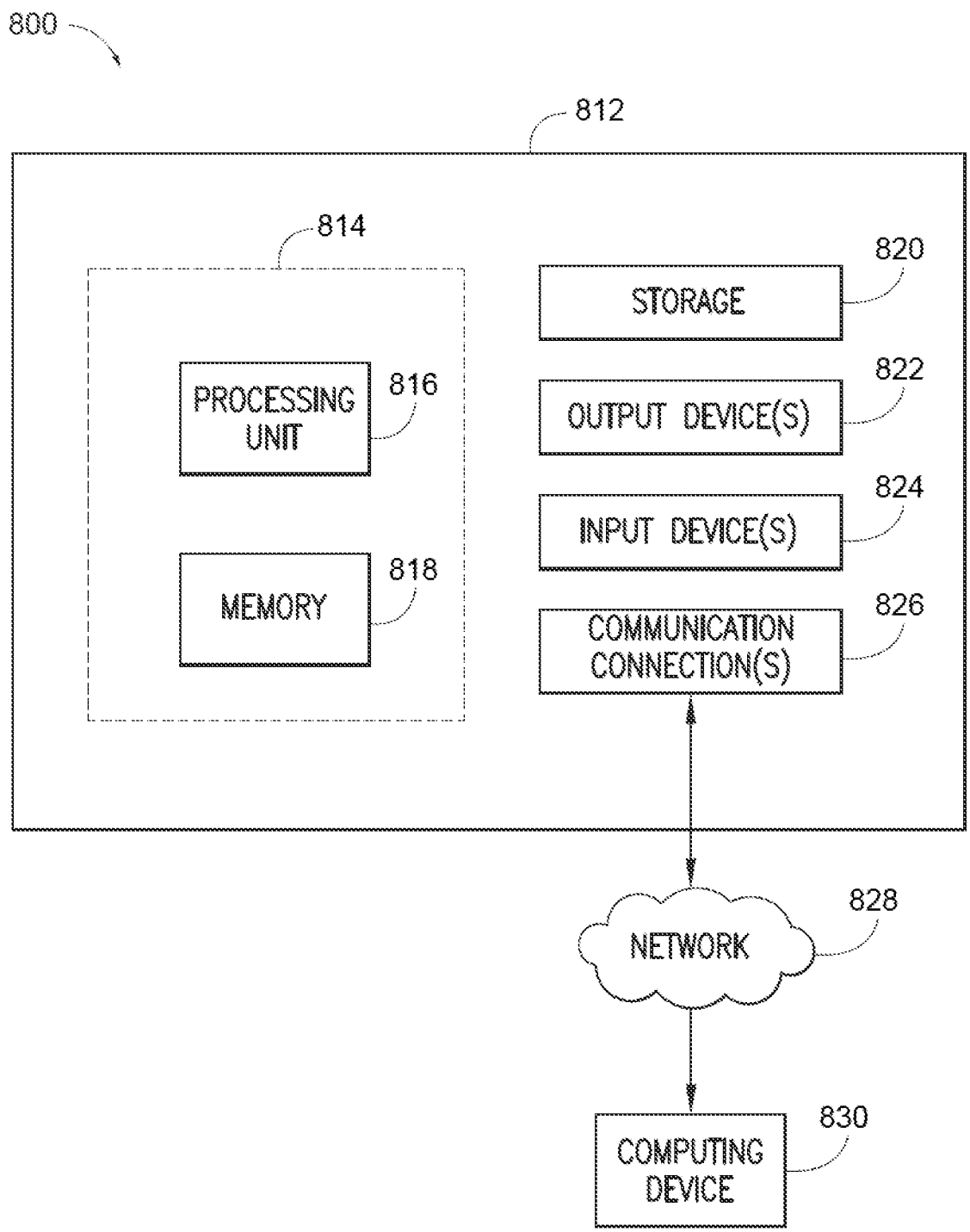
FIG. 8 is an illustration of an example computing environment where one or more of the provisions set forth herein are implemented, according to one aspect.

FIG. 8 and the following discussion provide a description of a suitable computing environment to implement aspects of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one aspect provided herein. In one configuration, the computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other aspects, the computing device 812 includes additional features or functionality. For example, the computing device 812 may include additional storage such as removable storage or non-removable storage, including, but not limited to, magnetic storage, optical storage, etc. Such additional storage is illustrated in FIG. 8 by storage 820. In one aspect, computer readable instructions to implement one aspect provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 812. Any such computer storage media is part of the computing device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 812 includes input device(s) 824 such as keyboard, mouse, pen, voice input device, touch input device, infrared cameras, video input devices, or any other input device. Output device(s) 822 such as one or more displays, speakers, printers, or any other output device may be included with the computing device 812. Input device(s) 824 and output device(s) 822 may be connected to the computing device 812 via a wired connection, wireless connection, or any combination thereof. In one aspect, an input device or an output device from another computing device may be used as input device(s) 824 or output device(s) 822 for the computing device 812. The computing device 812 may include communication connection(s) 826 to facilitate communications with one or more other devices 830, such as through network 828, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. An adaptive trust calibration based autonomous vehicle, comprising:
   one or more vehicle systems including a sensor detecting a detected object, the detected object classified as one of a dynamic object and a stationary object;
   a system behavior controller generating a driving automation signal indicative of a desired autonomous driving adaptation and human trust modeled using a Markov decision process model; and
   a driving automation controller:
   controlling one or more of the vehicle systems based on one or more parameters including a desired velocity, a current velocity of the autonomous vehicle, a desired minimum gap distance between the autonomous vehicle and the detected object, a current gap distance-gap between the autonomous vehicle and the detected object, a relative velocity of the detected object with respect to the autonomous vehicle, a desired time headway, a desired maximum acceleration, a desired braking deceleration, and an exponent;
   receiving the driving automation signal;
   adjusting one or more of the parameters based on a type of object associated with the detected object, wherein for each type of object one or more adjusted parameters have an aggressive driver model and a conservative driver model associated therewith; and
   implementing the desired autonomous driving adaptation via one or more of the vehicle systems based on a formulated adjusted driver model determined via the aggressive driver model or the conservative driver model of one or more of the adjusted parameters, wherein the desired autonomous driving adaptation is a more aggressive autonomous driving adaptation or a more conservative autonomous driving adaptation,
   wherein the formulated adjusted driver model is at least based on a product of the desired maximum acceleration and a difference between a tendency to accelerate and a tendency to decelerate for each type of object, wherein the tendency to accelerate is a function of the current velocity and the desired velocity, and the tendency to decelerate is a function of a desired dynamic gap distance between the autonomous vehicle and the detected object and the current gap distance.

2. The adaptive trust calibration based autonomous vehicle of claim 1, wherein the type of object includes a road sign, a pedestrian, or another vehicle.

3. The adaptive trust calibration based autonomous vehicle of claim 1, wherein the driving automation controller includes a high-level controller and a low-level controller.

4. The adaptive trust calibration based autonomous vehicle of claim 3, wherein the high-level controller implements the desired autonomous driving adaptation via one or more of the vehicle systems by adjusting one or more of the parameters based on a type of object associated with the detected object.

5. The adaptive trust calibration based autonomous vehicle of claim 3, wherein the low-level controller controls one or more of the vehicle systems based on one or more of the adjusted parameters.

6. The adaptive trust calibration based autonomous vehicle of claim 3, wherein the low-level controller includes a Stanley controller.

7. The adaptive trust calibration based autonomous vehicle of claim 1, wherein the driving automation signal is indicative of an over trust scenario or an under trust scenario.

8. The adaptive trust calibration based autonomous vehicle of claim 1, wherein one or more of the vehicle systems includes a controller area network (CAN) bus providing the current velocity of the autonomous vehicle.

9. A system for adaptive trust calibration, comprising:
an autonomous vehicle including one or more vehicle systems including a sensor detecting a detected object, the detected object classified as one of a dynamic object and a stationary object;
a system behavior controller generating a driving automation signal indicative of a desired autonomous driving adaptation and human trust modeled using a Markov decision process model; and
a driving automation controller:
controlling one or more of the vehicle systems based on one or more parameters including a desired velocity, a current velocity of the autonomous vehicle, a desired minimum gap distance between the autonomous vehicle and the detected object, a current gap distance-gap between the autonomous vehicle and the detected object, a relative velocity of the detected object with respect to the autonomous vehicle, a desired time headway, a desired maximum acceleration, a desired braking deceleration, and an exponent;
receiving the driving automation signal;
adjusting one or more of the parameters based on a type of object associated with the detected object, wherein one or more adjusted parameters have an aggressive driver model and a conservative driver model associated therewith; and
implementing the desired autonomous driving adaptation via one or more of the vehicle systems based a formulated adjusted driver model determined via the aggressive driver model or the conservative driver model of on one or more of the adjusted parameters, wherein the desired autonomous driving adaptation is a more aggressive autonomous driving adaptation or a more conservative autonomous driving adaptation,
wherein the formulated adjusted driver model is at least based on a product of the desired maximum acceleration and a difference between a tendency to accelerate and a tendency to decelerate for each type of object, wherein the tendency to accelerate is a function of the current velocity and the desired velocity, and the tendency to decelerate is a function of a desired dynamic gap distance between the autonomous vehicle and the detected object and the current gap distance.

10. The system for adaptive trust calibration of claim 9, wherein the type of object includes a road sign, a pedestrian, or another vehicle.

11. The system for adaptive trust calibration of claim 9, wherein the driving automation controller includes a high-level controller and a low-level controller.

12. The system for adaptive trust calibration of claim 11, wherein the high-level controller implements the desired autonomous driving adaptation via one or more of the vehicle systems by adjusting one or more of the parameters based on a type of object associated with the detected object.

13. The system for adaptive trust calibration of claim 11, wherein the low-level controller controls one or more of the vehicle systems based on one or more of the adjusted parameters.

14. The system for adaptive trust calibration of claim 11, wherein the low-level controller includes a Stanley controller.

15. A computer-implemented method for adaptive trust calibration, comprising:
receiving a driving automation signal indicative of a desired autonomous driving adaptation and human trust modeled using a Markov decision process model;
controlling one or more vehicle systems based on one or more parameters including a desired velocity, a current velocity of an autonomous vehicle, a desired minimum gap distance between the autonomous vehicle and a detected object, a current gap distance between the autonomous vehicle and a detected object, a relative velocity of the detected object with respect to the autonomous vehicle, a desired time headway, a desired maximum acceleration, a desired braking deceleration, and an exponent;
adjusting one or more of the parameters based on a type of object associated with the detected object, wherein one or more adjusted parameters have an aggressive driver model and a conservative driver model associated therewith; and
adjusting control of one or more of the vehicle systems based on a formulated adjusted driver model determined via the aggressive driver model or the conservative driver model of one or more of the adjusted parameters, wherein the desired autonomous driving adaptation is a more aggressive autonomous driving adaptation or a more conservative autonomous driving adaptation,
wherein the formulated adjusted driver model is at least based on a product of the desired maximum acceleration and a difference between a tendency to accelerate and a tendency to decelerate for each type of object, wherein the tendency to accelerate is a function of the current velocity and the desired velocity, and the tendency to decelerate is a function of a desired dynamic gap distance between the autonomous vehicle and the detected object and the current gap distance.

16. The computer-implemented method for adaptive trust calibration of claim 15, wherein the type of object includes a road sign, a pedestrian, or another vehicle.

17. The computer-implemented method for adaptive trust calibration of claim 15, wherein the driving automation signal is indicative of an over trust scenario or an under trust scenario.

* * * * *